United States Patent
Panara et al.

(10) Patent No.: US 9,507,678 B2
(45) Date of Patent: Nov. 29, 2016

(54) NON-DISRUPTIVE CONTROLLER REPLACEMENT IN A CROSS-CLUSTER REDUNDANCY CONFIGURATION

(71) Applicant: NetApp, Inc., Sunnyvale, CA (US)

(72) Inventors: Amit V. Panara, Bangalore (IN); Chaitanya V. Patel, Orange, CA (US); Hrishikesh Keremane, Sunnyvale, CA (US); Pankti Vinay Majmudar, Sunnyvale, CA (US); Santhosh Unnikrishnan, Kerala (IN); Sravan Kumar Elpula, Santa Clara, CA (US); Susan M. Coatney, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 101 days.

(21) Appl. No.: 14/541,119

(22) Filed: Nov. 13, 2014

(65) Prior Publication Data

US 2016/0140003 A1    May 19, 2016

(51) Int. Cl.
  *G06F 11/00* (2006.01)
  *G06F 11/20* (2006.01)
  *G06F 3/06* (2006.01)

(52) U.S. Cl.
  CPC .......... *G06F 11/2092* (2013.01); *G06F 3/067* (2013.01); *G06F 3/0617* (2013.01); *G06F 3/0653* (2013.01); *G06F 11/2017* (2013.01); *G06F 3/0629* (2013.01)

(58) Field of Classification Search
  CPC ................................................. G06F 11/2092
  USPC ............. 714/6.21, 6.22, 6.3, 6.23, 6.24, 4.1, 714/4.12, 4.21, 4.3
  See application file for complete search history.

(56) References Cited

U.S. PATENT DOCUMENTS

| | | | |
|---|---|---|---|
| 6,609,213 B1* | 8/2003 | Nguyen | G06F 11/2025 709/223 |
| 6,804,703 B1* | 10/2004 | Allen | H04L 69/40 709/216 |
| 7,640,451 B2 | 12/2009 | Meyer et al. | |
| 7,788,522 B1 | 8/2010 | Abdelaziz et al. | |
| 7,930,587 B1 | 4/2011 | Coatney et al. | |
| 8,484,163 B1 | 7/2013 | Yucel et al. | |
| 8,904,117 B1* | 12/2014 | Kalekar | G06F 12/0804 711/119 |

(Continued)

FOREIGN PATENT DOCUMENTS

WO    2011/149665 A1    12/2011

OTHER PUBLICATIONS

Int. Search Report/Written Opinion in PCT Application No. PCT/US2015/060345 dated Feb. 16, 2016, 13 pgs.

*Primary Examiner* — Dieu-Minh Le
(74) *Attorney, Agent, or Firm* — Cooper Legal Group, LLC (57) ABSTRACT

During a storage redundancy giveback from a first node to a second node following a storage redundancy takeover from the second node by the first node, the second node is initialized in part by receiving a node identification indicator from the second node. The node identification indicator is included in a node advertisement message sent by the second node during a giveback wait phase of the storage redundancy giveback. The node identification indicator includes an intra-cluster node connectivity identifier that is used by the first node to determine whether the second node is an intra-cluster takeover partner. In response to determining that the second node is an intra-cluster takeover partner, the first node completes the giveback of storage resources to the second node.

20 Claims, 6 Drawing Sheets

(56) References Cited

U.S. PATENT DOCUMENTS

| | | | |
|---|---|---|---|
| 2002/0188590 A1* | 12/2002 | Curran | G06F 3/0622 |
| 2003/0158933 A1* | 8/2003 | Smith | H04L 1/22 709/224 |
| 2005/0283641 A1* | 12/2005 | Clark | G06F 11/2028 714/4.11 |
| 2007/0168693 A1* | 7/2007 | Pittman | G06F 11/2092 714/4.11 |
| 2007/0234115 A1* | 10/2007 | Saika | G06F 11/2028 714/13 |
| 2011/0213753 A1* | 9/2011 | Manmohan | G06F 11/2023 707/640 |
| 2013/0318297 A1 | 11/2013 | Jibbe et al. | |
| 2013/0346790 A1 | 12/2013 | Elpula et al. | |
| 2014/0047263 A1 | 2/2014 | Coatney et al. | |

* cited by examiner

NON-DISRUPTIVE CONTROLLER REPLACEMENT IN A CROSS-CLUSTER REDUNDANCY CONFIGURATION

BACKGROUND

Embodiments of the disclosed subject matter generally relate to the field of storage networks and, more particularly, to storage controller replacement within cross-cluster redundancy configurations.

Computer clusters implement a form of distributed computing. A computer cluster consists of a set of nodes that are configured and communicatively coupled in a cooperative manner to share resources and in some respects operate as a single system. The components of a cluster typically include multiple server nodes and one or more cluster management nodes interconnected by a local area network (LAN), with each node running its own instance of a common operating system. Clusters are usually deployed to improve performance and availability over that of centralized computing, while typically being more cost-effective than single computers of comparable speed or availability.

A storage cluster is a type of networked computer cluster generally characterized as including multiple interconnected storage nodes. Each storage node consists of a controller coupled to a mass storage unit such as an array of storage disks or solid state drives (SSDs) on which data, sometimes referred to as "backend data," is stored. The storage node controller performs server-like functions for optimizing access to and usage of storage resources including the stored data. The mass storage unit may be a Redundant Array of Independent Disks (RAID) that provides long-term, non-volatile data storage.

Ensuring continuous, uninterrupted access to backend data is a vital function of most storage clusters. So-called High Availability (HA) storage is often used to ensure uninterrupted access to backend data in the event of an interruption to a given storage node's operation. The interruption may be due to a hardware or software failure, or due to maintenance (e.g., replacement) of a storage node. An HA configuration may define a cluster (an HA cluster) or may be a cluster configuration feature such as one or more HA pairs within an otherwise defined cluster. In either case, the basic HA storage configuration consists of at least two somewhat independent storage nodes that perform mutual backup roles under the management of system control code and related configuration settings. Simply, when one of the nodes fails, the other immediately assumes control of its HA partner node's operation and storage.

The increasing scale of distributed data storage has raised the need to expand protection of stored data and uninterrupted access thereto beyond intra-cluster backup redundancy. This need is being addressed by the growing prevalence of data redundancy across clusters. Storage redundancy across clusters, such as within data centers which may be physically separated by tens or even hundreds of kilometers, uses data replication such as by data mirroring. In this manner, the data and uninterrupted access thereto are protected against site-wide failures that may result, for example, from loss of power.

BRIEF DESCRIPTION OF THE DRAWINGS

The embodiments may be better understood by referencing the accompanying drawings.

DESCRIPTION OF EMBODIMENTS

The description that follows includes example systems, methods, techniques, instruction sequences and computer program products that embody techniques of the disclosed subject matter. However, it is understood that the described embodiments may be practiced without one or more of these specific details. Well-known instruction instances, protocols, structures and techniques have not been shown in detail in order not to obfuscate the description. As utilized herein, the term "node" with or without additional descriptors (e.g., storage node, controller node, etc.) may refer to a cluster configuration identifier or to a controller device such as that depicted in FIG. 2.

Clustered storage configured as HA pairs is widely used to provide distributed storage while protecting against system hardware and/or software failures in the member devices. Node takeover (often referred to as "failover") is a standard mechanism used by HA pairs to provide uninterrupted access to stored data upon a failure or abnormal termination of a storage node. Essentially, a failover entails a backup node assuming control of the storage devices and network connections previously controlled by the failed node so that the backup node can provide uninterrupted data availability.

Cross-cluster data redundancy is designed to protect against larger scale failures, such as rolling hardware failures, and is sometimes referred to in terms of "disaster recovery" redundancy or "site recovery" redundancy. Synchronous data mirroring and non-volatile random access memory (NVRAM) write cache replication may be used to maintain a consistent operational state and version of aggregate data between two sites that, unlike nodes local to a given cluster, do not share data storage devices. In one embodiment, the disclosure is directed to maintaining HA operational continuity for a controller replacement within a cross-cluster redundancy configuration.

A. High Availability Cluster Environment

Figure 1:
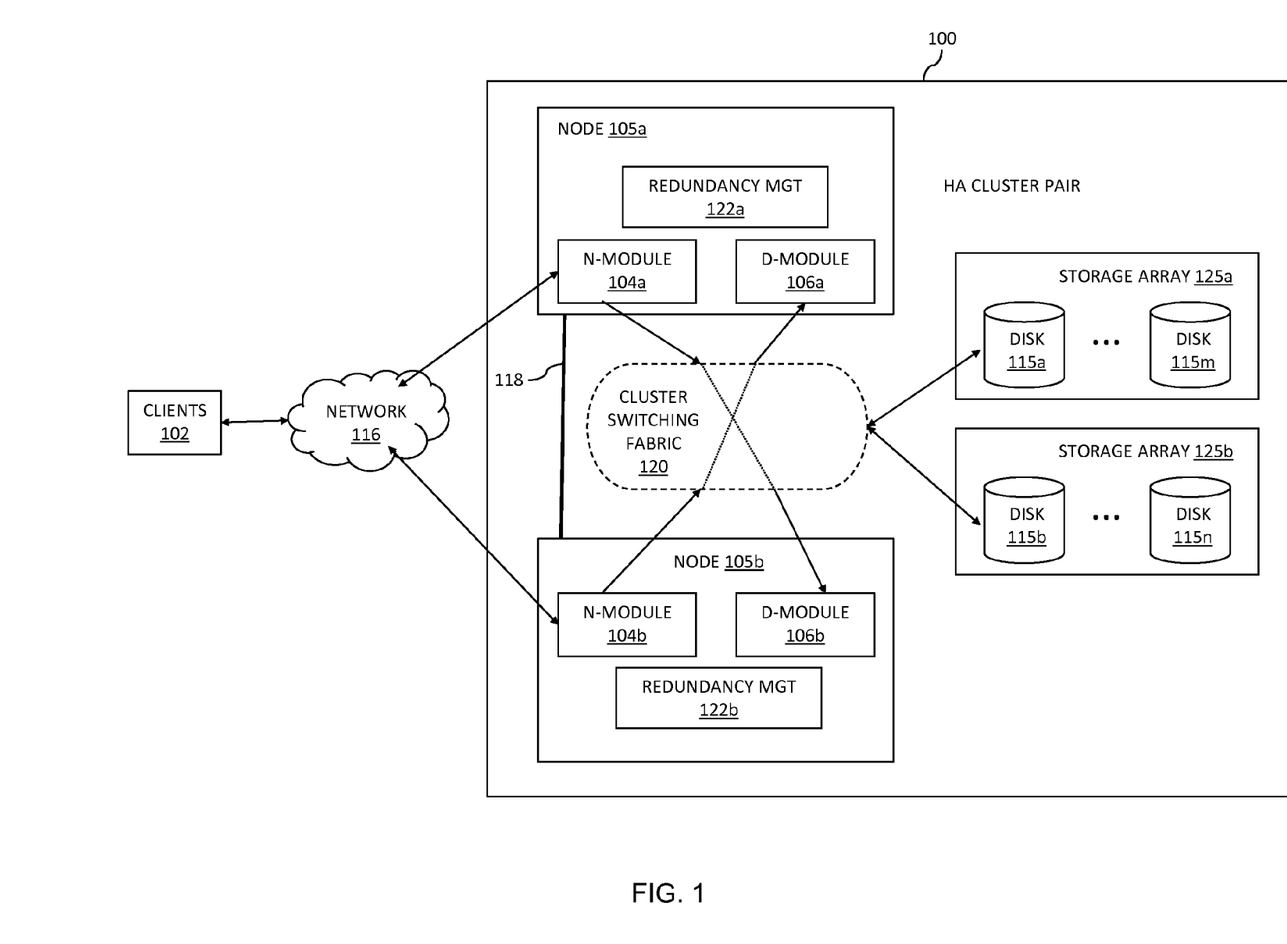
FIG. 1 is a block diagram depicting a High Availability (HA) controller pair such as may be used for backup redundancy within a storage cluster in accordance with an embodiment of the disclosure.

FIG. 1 is a schematic block diagram depicting a pair of nodes 105a and 105b interconnected as a high-availability (HA) cluster pair 100 and configured to provide storage services relating to the organization of and access to information on mass storage devices. Nodes 105a and 105b include various functional components that cooperate to provide HA failover redundancy as well as a distributed storage system architecture. To this end, each of nodes 105a and 105b is configured as a network element (N-modules 104a and 104b) and a data storage element (D-modules 106a and 106b). Each of N-modules 104a and 104b includes functionality enabling the respective nodes 104a and 104b to, for example, connect to clients 102 over a computer network 116, while each of D-modules 106a and 106b connects to one or more storage devices, such as storage drives 115a-m and 115b-n within storage arrays 125a and 125b, respectively. Nodes 105a and 105b are interconnected by a cluster switching fabric 120, which may be a Gigabit Ethernet switch in the depicted embodiment.

Information storage on each of storage arrays 125a and 125b is preferably implemented as one or more addressable storage areas, referred to as storage volumes, that reside on a collection of physical storage drives 115a-m and 115b-n cooperating to define an overall logical arrangement of volume block number space on the volume(s). Each logical volume is generally, although not necessarily, associated with its own file system. The storage drives within a logical volume/file system may comprise any combination of solid state drives (SSDs) and/or magnetic disks and are typically organized as one or more groups, wherein each group may be operated as a Redundant Array of Independent Disks (RAID).

As further depicted in FIG. 1, nodes 105a and 105b are also coupled across a cluster interconnect 118 which provides an additional communication path between the nodes. Cluster interconnect 118 may be Fibre Channel (FC), Infini-Band or another suitable transport medium. Cluster interconnect 118 may be used to transport "heartbeat" signals between nodes 105a and 105b, which signals are used to monitor the active state of each node. The cluster heartbeat signals are also sent across cluster switching fabric 120 over which communications between N-module 104 and D-module 106 are illustratively transported. Node failure is indicated by the loss of heartbeat over both the cluster interconnect and the storage layer. Cluster interconnect 118 also serves as the storage takeover interconnect. That is, if the heartbeat signal terminates (e.g., "times out"), then a failover/takeover procedure is commenced over cluster interconnect 118.

The clients 102 may be general-purpose computers configured to interact with nodes 105a and 105b in accordance with a client/server model of information delivery. That is, clients 102 may request the services of a node either directly or via a host server, and the node responds to the client service requests by exchanging packets over network 116. A client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The purpose of an HA cluster pair such as HA pair 100 is to provide operational continuity and uninterrupted storage resources availability during maintenance events such as controller replacement as well as unexpected events such as hardware or software failures. During normal cluster operation, a storage controller node, such as node 105a that is connected to and has primary operational control of storage drives 115a-m is identified in accordance with the HA configuration as the "home" of drives 115a-m. As such HA node 105a is also identified as the "current owner" at initialization and is primarily responsible for servicing data requests directed to blocks of volumes contained on storage drives 115a-m. Similarly, storage node 105b is primarily responsible for the SSDs and/or disks represented as storage drives 115b-n within storage array 125b. HA pair 100 is configured such that either of nodes 105a or 105b can take over data servicing capabilities for the other node in the event of a failure or maintenance downtime. As used herein, "takeover" may refer to either a planned takeover of one HA node partner by the other partner, or a "failover" sequence in which the takeover is caused by a runtime failure or other unexpected event.

An HA partner node is able to take over the management services of the other controller node by virtue of shared access to storage devices and write cache replication between the nodes. In the depicted embodiment, nodes 105a and 105b have shared operational access to storage arrays 125a and 125b. Furthermore, HA pair 100 is configured such that NVRAM write cache content (depicted and described with reference to FIG. 2) is replicated between nodes 105a and 105b.

As depicted and explained in further detail with reference to FIG. 3, HA pair 100 may be configured in a cross-cluster configuration with at least one other HA pair having its own managed storage arrays. As shown in FIG. 1, nodes 105a and 105b further include redundancy management modules 122a and 122b that are typically incorporated with the nodes' respective storage operating system instances. As explained in further detail with reference to FIGS. 3-5, management modules 122a and 122b include instructions that when executed by processors in the HA nodes, enable any of the individual nodes in HA pairs belonging to a cross-cluster configuration to both non-disruptively recognize an HA partner node following a takeover sequence and efficiently update node configuration information following an HA pair giveback sequence.

B. Storage System Node

Figure 2:
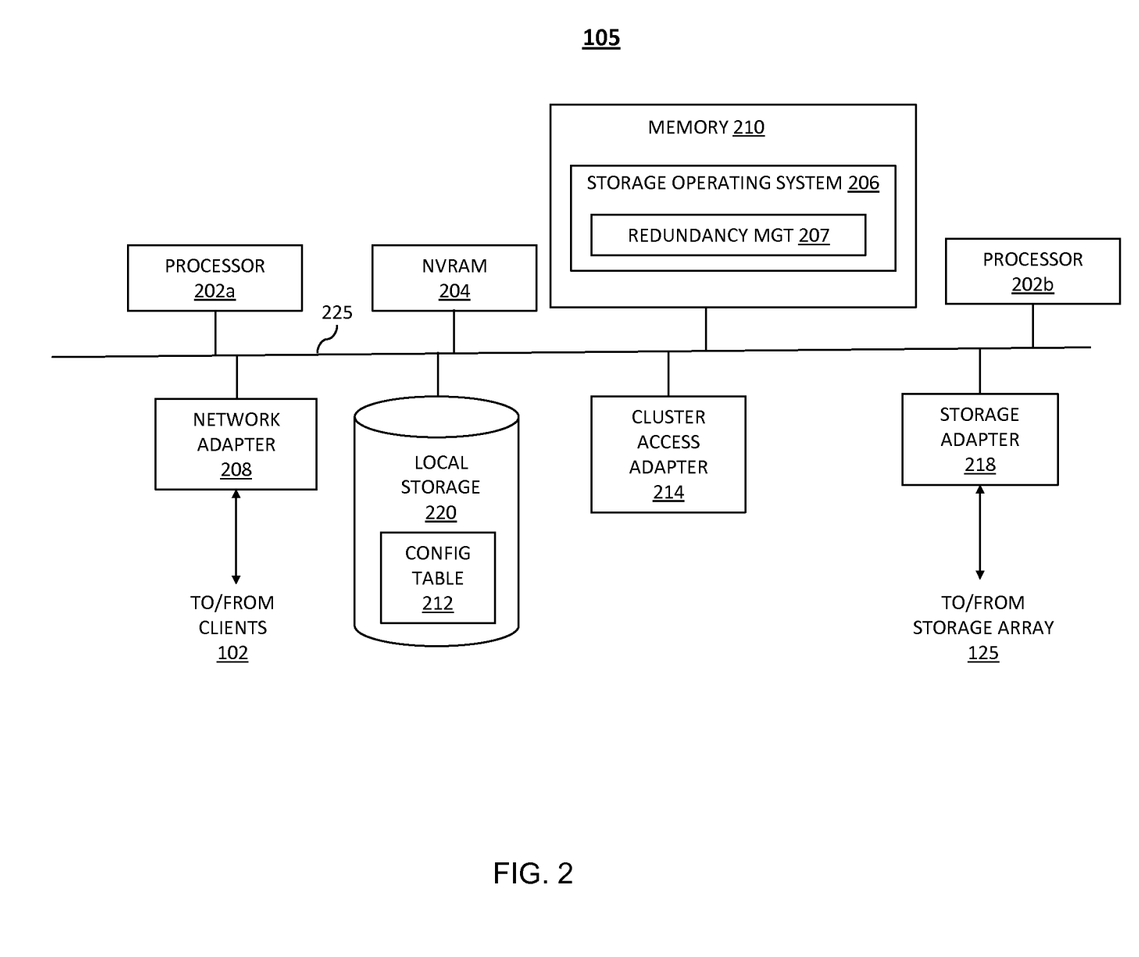
FIG. 2 is a block diagram illustrating a storage node in accordance with an embodiment of the disclosure.

FIG. 2 is a block diagram providing a more detailed illustration of a controller node 105 that is representative of either of nodes 105a or 105b. As depicted in FIG. 2, node 105 includes a system bus 225 that interconnects processors 202a and 202b, a memory 210, a network adapter 208, a cluster access adapter 214, an NVRAM 204, a storage adapter 218, and local storage 220. NVRAM 204 can be used for I/O staging by caching incoming client I/O requests. The local storage 210 comprises one or more storage devices, such as magnetic disks or SSDs, which can be utilized by node 105 to locally store configuration information, such as within a configuration table 212. Cluster access adapter 214 includes multiple ports adapted to couple node 105 to other nodes of the cluster to which HA pair 100 belongs. In the depicted embodiment, Ethernet may be used as the clustering protocol and interconnect media, although it will be apparent to those skilled in the art that other protocols and interconnects may be utilized within the cluster architecture described herein.

Node 105 is further depicted as a dual processor controller executing a storage operating system 206 that preferably implements a high-level module, such as a file system, to logically organize the information as a hierarchical structure of named data containers, such as directories, files and special types of files called virtual disks (sometimes referred to as "blocks") on the SSDs or disks. However, it will be apparent to those of ordinary skill in the art that node 105 may alternatively comprise a single or more than two processor system. In one embodiment, one processor 202a executes the functions of the N-module 104a on the node, while the other processor 202b executes the functions of the D-module 106a.

Memory 210 comprises storage locations that are addressable by the processors and adapters for storing software program code and data structures associated with the disclosed embodiments. The processor and adapters may, in turn, comprise processing elements and/or logic circuitry configured to execute the program code and manipulate the data structures. Storage operating system 206, portions of which are typically resident in memory and executed by the processing elements, functionally organizes node 105 by, inter alia, invoking storage operations in support of the storage service implemented by the node. It will be apparent to those skilled in the art that other processing and memory means, including various computer readable media, may be used for storing and executing program instructions pertaining to the embodiments described herein. In the depicted embodiment, storage operating system 206 further includes a cross-cluster redundancy management module 207 that includes program instructions that when executed by one or more processors implement one or more of the functions depicted and described with reference to FIGS. 3, 4, and 5.

Network adapter 208 comprises a plurality of ports adapted to couple node 105 to one or more clients 102 over point-to-point links, wide area networks, virtual private networks implemented over a public network or a shared local area network. Network adapter 208 thus may comprise the structure and circuitry as well as the logic constructs needed to communicatively couple node 105 to the network 116 (FIG. 1). In one embodiment, network 116 may be an Ethernet network or a FC network. Each client 102 may communicate directly or via a host server with node 105 over network 116 by exchanging discrete frames or packets of data according to pre-defined protocols, such as TCP/IP.

Storage adapter 218 functions cooperatively with storage operating system 206 to access storage resources (e.g., requested information) within storage arrays 125a and 125b on behalf of clients 102. Information may be stored in storage arrays 125a and 125b on any type of attached array of writable storage device media such as magnetic tape, optical media, electronic random access memory, SSD, and any other similar media adapted to store information, including data and meta data. In the depicted embodiment, the information is stored on storage drives 115 of storage arrays 125a and 125b. Storage adapter 218 further includes multiple ports having I/O interface circuitry (not depicted) communicatively coupled to drives 115 over an I/O interconnect, such as a FC link topology.

C. Cross-Cluster Redundancy

Figure 3:
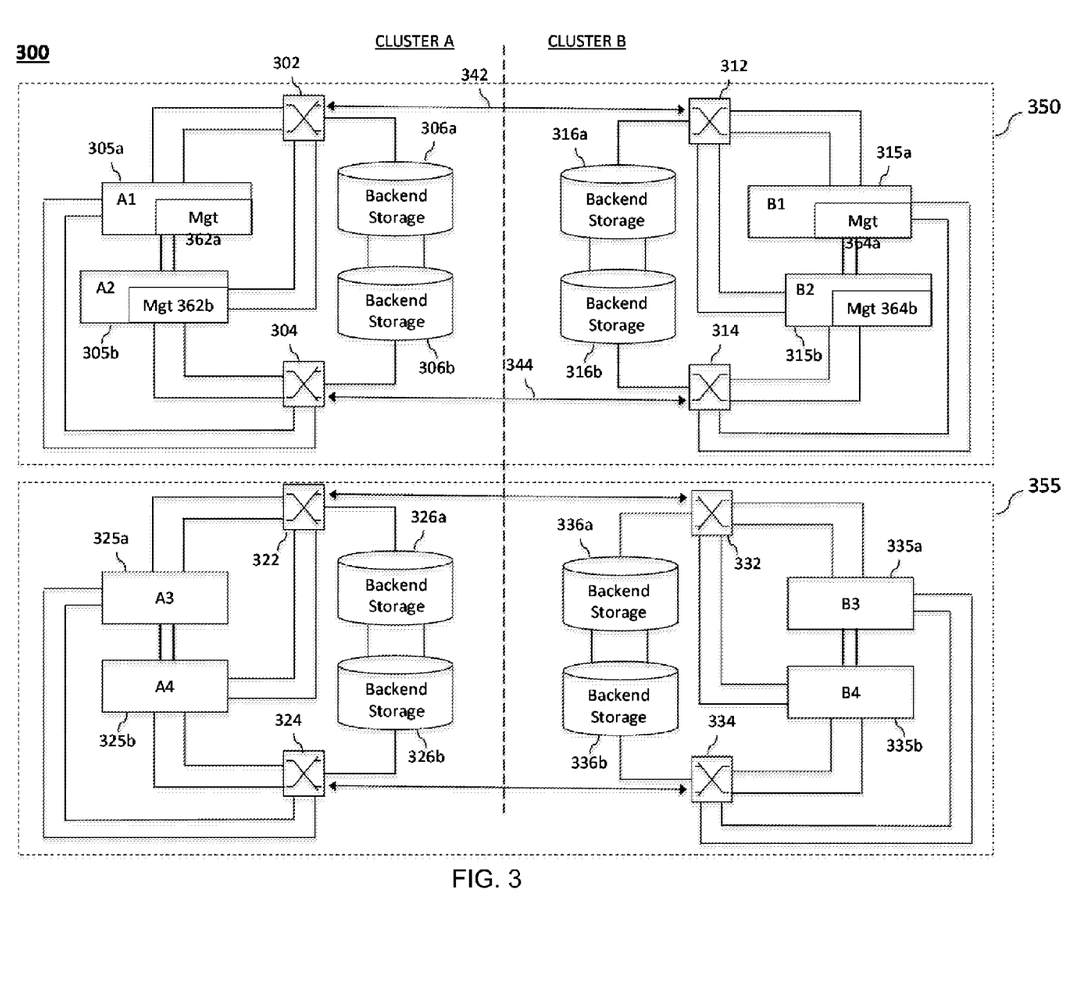
FIG. 3 is a block diagram depicting a cross-cluster storage redundancy configuration in accordance with an embodiment of the disclosure.

FIG. 3 is a block diagram depicting a cross-cluster storage system 300 that includes storage nodes forming HA pairs within a Cluster A and a Cluster B. Cluster A includes a first storage controller node pair, A1 and A2, and a second node pair, A3 and A4. The node pairs A1/A2 and A3/A4 are also sub-clusters within Cluster A, forming respective HA cluster pairs. System 300 further includes two additional HA cluster pairs, B1/B2 and B3/B4 that are members of Cluster B which may be physically remote from Cluster A. While communicatively coupled such as to mirror data and replicate NVRAM content, the controller nodes within each of Clusters A and B do not share operational control of storage array devices with nodes in the other Cluster.

As explained with reference to FIGS. 1 and 2, HA pairs such as pairs A1/A2 and B1/B2 minimize downtime due to system failures or maintenance by providing operational continuity via shared operational access to storage devices and replication of the NVRAM I/O staging cache. In addition to intra-cluster redundancy, the depicted embodiments provide cross-cluster data protection and operational continuity by configuring HA pairs belonging to one cluster in association with HA pairs in another cluster. Typically, such configured associations are established during system startup and are maintained until the system is shutdown for reconfiguration. FIG. 3 illustrates the cross-cluster configuring of HA pairs as comprising a first cross-cluster configuration 350 and a second cross-cluster configuration 355. The depicted configurations 350 and 355 each comprise four nodes grouped and divided into one HA pair in each of Clusters A and B which is the minimum number of HA pairs and minimum total number of controller nodes needed to maintain intra-cluster HA redundancy in both clusters while maintaining cross-cluster mirroring.

Cross-cluster configuration 350 includes HA pair A1/A2 that share operational access to storage arrays 306a and 306b through a Fibre Channel (FC) switching network comprising FC switches 302 and 304. Configuration 350 includes a corresponding "partner" HA pair B1/B2 that share operational access to storage arrays 316a and 316b through an FC switching network comprising FC switches 312 and 314. Cross-cluster configuration 355 includes HA pair A3/A4 (comprising storage controller nodes 325a and 325b) that share operational access to storage arrays 326a and 326b through an FC switching network comprising FC switches 322 and 324. Cross-cluster configuration 355 also includes HA pair B3/B4 (comprising storage controller nodes 335a and 335b) that share operational access to storage arrays 336a and 336b through an FC switching network comprising FC switches 332 and 334.

The configuration and operation of configurations 350 and 355 are substantially similar. The intra-cluster HA operations and cross-cluster redundancy operations of configuration 350 will be described for purposes of illustration. During normal runtime operations, each of controller nodes A1 305a and A2 305b controls its own respectively assigned subset of storage arrays 306a and 306b. For example, HA pair A1/A2 may be configured within Cluster A such that controller node 305a has operational control of storage array 306a via switch 302. The shared access to storage arrays 306a and 306b, together with the replication of NVRAM I/O staging cache content (not depicted in FIG. 3), enables node 305b to assume operational control of storage array 306a to maintain operational continuity if node 305a fails or is taken offline. Similar to the operation of HA pair A1/A2, during normal runtime operations, each of controller nodes B1 315a and B2 315b controls its own respectively assigned subset of storage arrays 316a and 316b. For example, HA pair B1/B2 may be configured within Cluster B such that controller node 315a has operational control of storage array 316a via switch 312. The shared access to storage arrays 316a and 316b, together with the replication of NVRAM I/O staging cache content (not depicted in FIG. 3), enables node 315b to assume operational control of storage array 316a to maintain operational continuity if node 315a fails or is taken offline.

HA pairs A1/A2 and B1/B2 are mutually programmed and otherwise configured within configuration 350 to provide cross-cluster data redundancy and operational continuity. Each node has a configuration-specified relationship to each of its two cross-cluster partners in addition to its intra-cluster HA partnership. In the depicted example, node A1 may be associated by the configuration to have a cross-cluster "partner" relation with node B1 and is further associated by the configuration to have an "auxiliary" (i.e., backup) cross-cluster partner relationship with node B2. In such a case, node B1 would be the reciprocal cross-cluster partner of node A1, and node A2 would be the auxiliary cross-cluster partner of node B1. In the depicted embodiment, HA node pairs A3/A4 and B3/B4 may be similarly configured to form cross-cluster partners and auxiliary partners within configuration 355.

Similar to the HA pair mechanism described above, the operational continuity provided by the respective cross-cluster redundancy partnerships and auxiliary partnerships is enabled in part by synchronously replicating NVRAM I/O staging cache content between the respective partners. Data may be replicated between the cross-cluster partners, such as nodes A1 and B1, by synchronously mirroring stored data aggregates between the respective backend storage devices 306a, b and 316a, b via long haul FC connections 342 and 344. In one embodiment, RAID level data mirroring may be used to perform the cross-cluster backend storage replication. As shown in the depicted embodiment, controller nodes 305a, 305b, 315a, and 315b respectively include cross-cluster redundancy management modules 362a, 362b, 364a, and 364b. As depicted and explained in further detail with reference to FIGS. 4 and 5, the management modules include logic enabling the respective controller nodes to non-disruptively perform takeover/giveback HA operations in a cross-cluster configuration.

Figure 4:
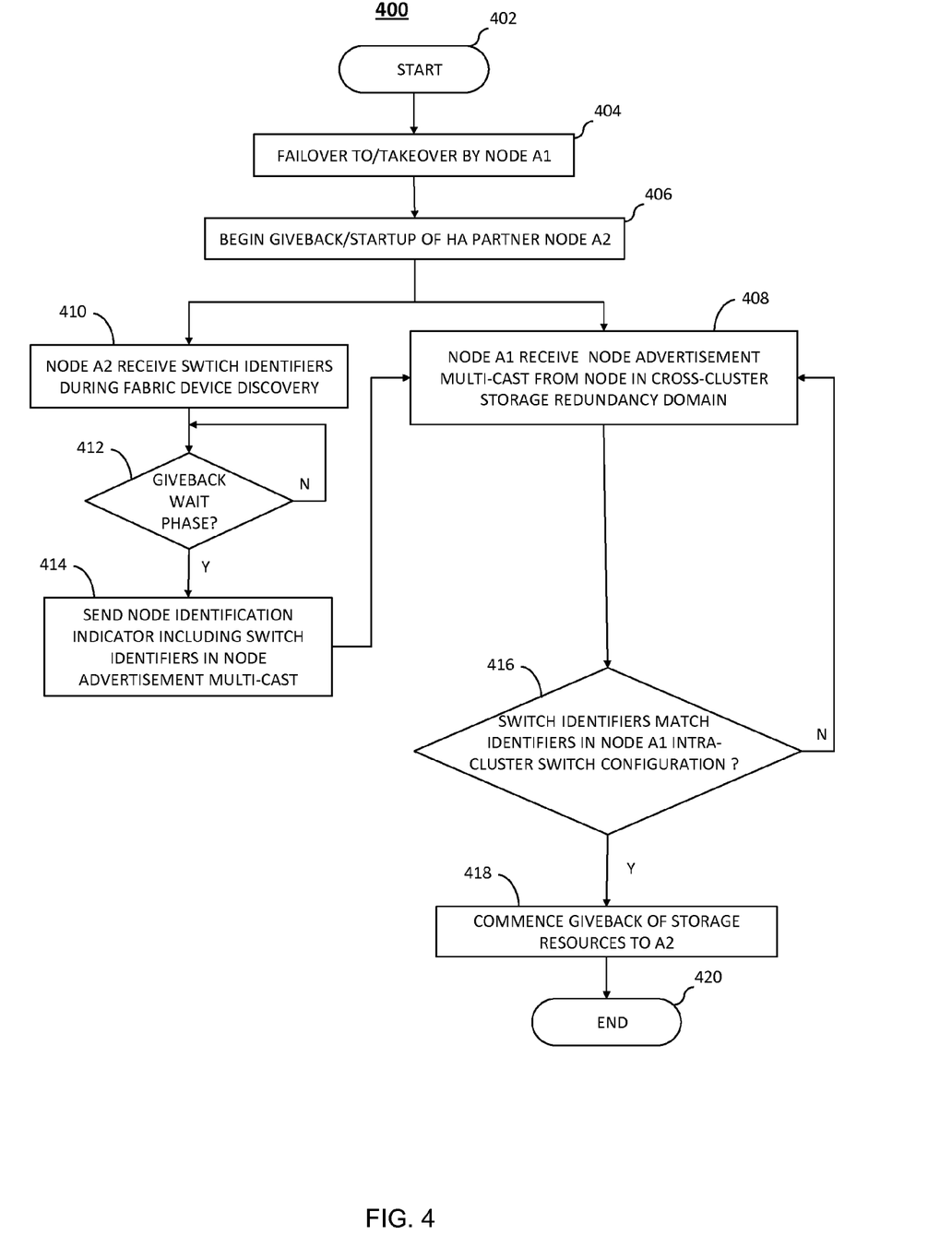
FIG. 4 is a flow diagram illustrating operations performed by a High Availability (HA) pair during and following storage controller replacement in accordance with an embodiment of the disclosure.

FIG. 4 is a flow diagram illustrating operations performed by HA pair A1/A2 within cross-cluster configuration 350 during and following storage controller replacement in accordance with an embodiment of the disclosure. Beginning at step 402 and proceeding to step 404, HA pair A1/A2 commences a takeover procedure in which node A1 assumes control of backend storage array 306b and corresponding storage connections that A2 previously controlled. Prior to takeover, the cross-cluster configuration interconnect, which includes long haul FC connections 342 and 344, is used by member nodes A1, A2, B1 and B2 to mirror log data of each respective HA partner's NVRAM. Such NVRAM replication from A2 together with its shared access to backend storage 306b, enable node A1 to immediately assume control of A2's ongoing controller node function automatically in response to a failed heartbeat signal from A2, or as in the example embodiment, in response to an administrator signal that node A2 will be shutdown for controller replacement.

The A2 node controller 305b may include one or more components depicted in FIG. 2, including processor and associated memory elements and also including an NVRAM card. Once the controller is replaced and powered on, the process continues as shown at step 406 with a giveback procedure in which node A2, with its new controller, will negotiate with node A1 to again assume control of storage devices and connections for which A2 is configured to manage during normal operations. Early in the startup boot process, node A2 initializes its connectivity interfaces with the FC fabric comprising switches 302 and 304. During initialization (fabric discovery), A2 determines its intra-cluster storage connectivity by obtaining identifiers from switches 302 and 304 in the form of the switches' respective World Wide Names (WWNs) (step 410). A WWN or World Wide Identifier (WWID) is a unique identifier used in storage technologies including Fibre Channel, Advanced Technology Attachment, or Serial Attached SCSI. In the depicted embodiment, node A2 determines/discovers the WWNs of local Fibre Channel switches 302 and 304. The discovered WWNs may be, for example, World Wide Node Names that identify the switches in terms of serial numbers.

Node A2 305b announces its reentry onto the FC interconnect of cross-cluster configuration 350 by multi-casting a node advertisement that indicates node A2's identity. As shown at step 412, the node advertisement multi-cast preferably coincides with a giveback wait phase during which A2 does not yet have access to its resources such as a mailbox root disk within storage array 306b that records A2's controller device ID and cross-cluster configuration ID. At this point, before node A2 has access to its unique cross-cluster configuration ID, the process continues at step 414 with A2 multi-casting its node advertisement to all member nodes (i.e., A1, B1, and B2) of cross-cluster configuration 350. In accordance with the depicted embodiment, the node advertisement includes node identification information including the switch identifiers that A2 obtained at step 410.

Step 408 depicts node A1 receiving any given node advertisement from any given member node of cross-cluster configuration 350. Typically, the node advertisement will include a Cluster ID, a Node System ID, and a Node Config ID. The Cluster ID identifies the cluster that the node belongs to such that in the depicted embodiment, nodes A1 and A2 will have the same Cluster ID as will B1 and B2. The Node System ID is a number or alphanumeric code that individually identities the controller hardware. In the depicted example, the Node System ID will have changed for node A2 because its controller has been replaced. The Node Config ID is a code that identifies the node in terms of its function, connectivity, and mutual relations with other nodes in the cross-cluster configuration. Therefore, the Node Config ID remains the same in association with a given "node" regardless of whether or not the node's controller is replaced.

Given the four-node membership of cross-cluster configuration 350, any of the member nodes such as A1 as shown at step 408 may receive anode advertisement message from any of at least three member nodes. As explained above, all member nodes have a defined role with respect to each of the other members and the Node Config ID defines this role. However, when a node such as A2 is restarted following controller replacement, it does not have access to its Node Config ID which is stored on a mailbox root disk, access to which has yet to be returned by node A1. During the giveback wait phase of startup for A2, node A1 receives a multi-cast from node A2 (step 408) that includes the switch identifier information obtained by node A2 at step 410. As shown at step 416, node A1 determines whether the intra-cluster identifier switch identifier in this case) included with the multi-cast from node A2 matches or otherwise corresponds to its own intra-cluster connectivity information to determine whether A2 is its HA pair partner. In response to determining that the switch identifiers contained in A2's node advertisement message match its own intra-cluster connectivity information (e.g., matches its own corresponding record of which local switches it is connected to), A1 commences giveback of the storage resources (step 418) and the process ends with A2 being brought back online within the cross-cluster configuration.

Figure 5:
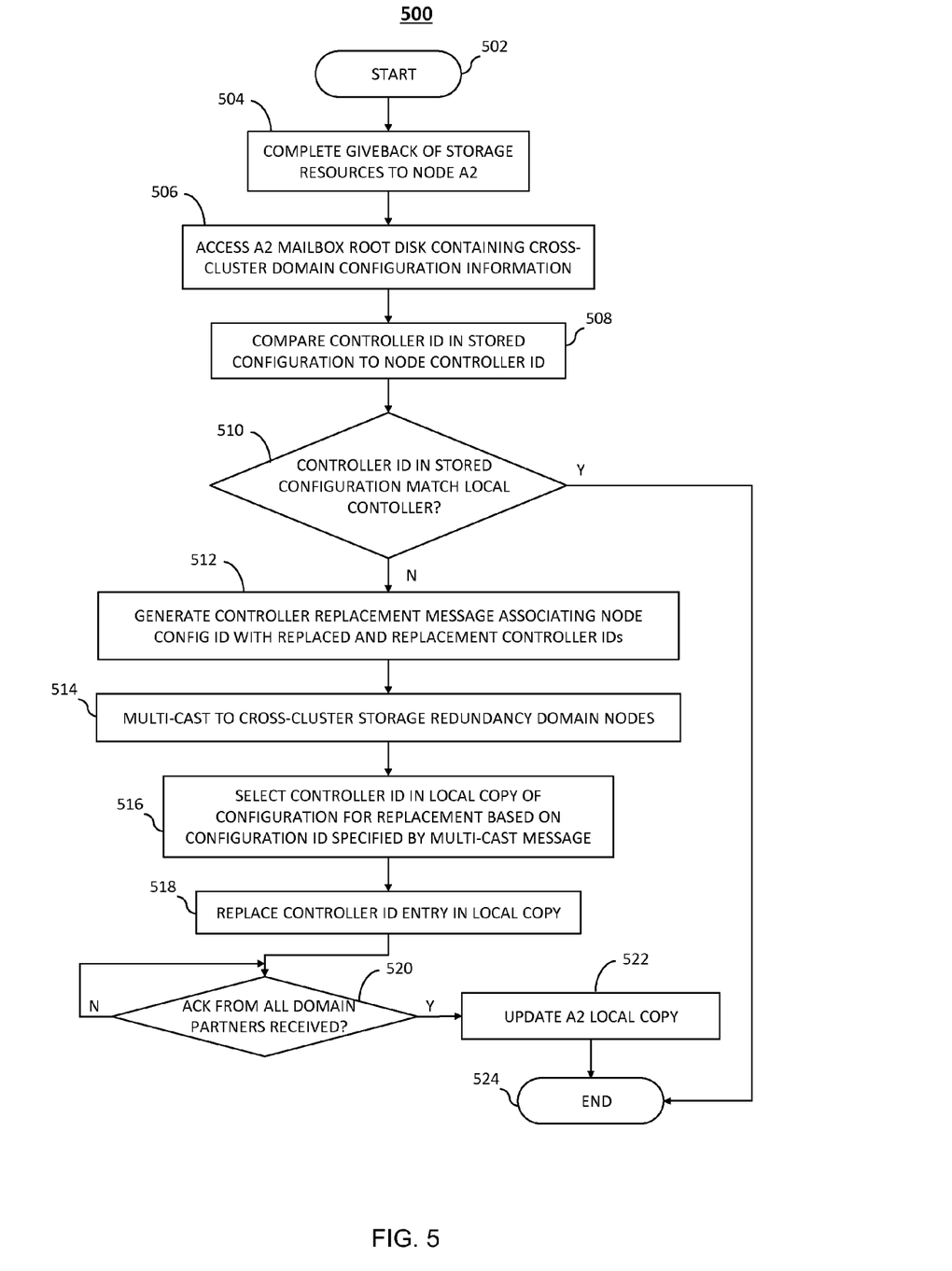
FIG. 5 is a flow diagram depicting operations performed by member nodes of a cross-cluster storage redundancy configuration following storage controller replacement in accordance with an embodiment of the disclosure.

FIG. 5 is a flow diagram depicting operations performed by one or more of member nodes A1, A2, B1 and B2 of cross-cluster configuration 350 following replacement of the node A2 controller in accordance with an embodiment of the disclosure. The steps depicted and described with reference to FIG. 5 may be combined with the steps and features described with reference to FIG. 4 to enable non-disruptive storage controller replacement for clustered storage nodes that are configured as HA pairs and are incorporated into a cross-cluster redundancy domain. The process begins as shown at step 502 and continues with completion of the giveback of storage resources (control of storage devices and network connections) from node A1 to node A2. Next, as shown at step 504, node A2 accesses its mailbox root disk on which is stored the configuration information for itself and the other three members of cross-cluster configuration 350. As described with reference to FIG. 4, node A2, having been restarted with its new controller, has been recognized by node A1 as A1's HA cluster partner. However, node A2 has not been reestablished in its role with respect to nodes A1, B1, and B2 (as HA partner, cross-cluster partner, or auxiliary cross-cluster partner) within cross-cluster configuration 350. At steps 506 and 508, A2 reads a copy of configuration information for cross-cluster configuration 350 that is locally stored in A2's mailbox root disk. The configuration information is consistent with the node advertisement identifier information described above with reference to FIG. 4. Namely, the locally stored configuration information includes for each member a Cluster ID, a Node System ID, a Node Configuration ID, and per the described embodiments, an Intra-Cluster Connectivity ID.

The Node System ID corresponds to the device identifier of a node's controller, typically represented as the serial number of the NVRAM card contained within the controller. In the depicted example, the copy of the cross-cluster configuration information stored locally within A2 will include an identifier of the controller that was replaced as the Node System ID. As shown at step 508, A2 compares the locally recorded Node System ID with an identifier of its newly installed controller device (step 510). If, as shown beginning at step 512, A2 determines that the locally stored controller identifier is different than the identifier of the newly installed controller, A2 generates a controller replacement message to be multi-cast (step 514) to the other cross-cluster configuration members.

The controller replacement message includes the identifier of the replaced A2 controller (i.e., the current locally stored Node System ID for A2) and the corresponding identifier of the replacement A2 controller, both in association with A2's Node Config ID, which, as previously explained, remains unchanged following controller replacement. Having received the multi-cast controller replacement message, each of recipient member nodes A1, B1, and B2 uses the specified Node Config ID as a key to identify which member node's Node System ID requires replacement (step 516). Upon replacing the Node System ID (i.e., controller device ID) in its locally stored copy of the cross-cluster configuration information as shown at step 518, each member node sends an ACK to the multi-cast sender, A2. The process is completed when A2, having confirmed receipt of ACK replies from all member nodes updates its own local configuration copy to replace the previous controller ID with the new controller ID (steps 520, 522, and 524).

Figure 6:
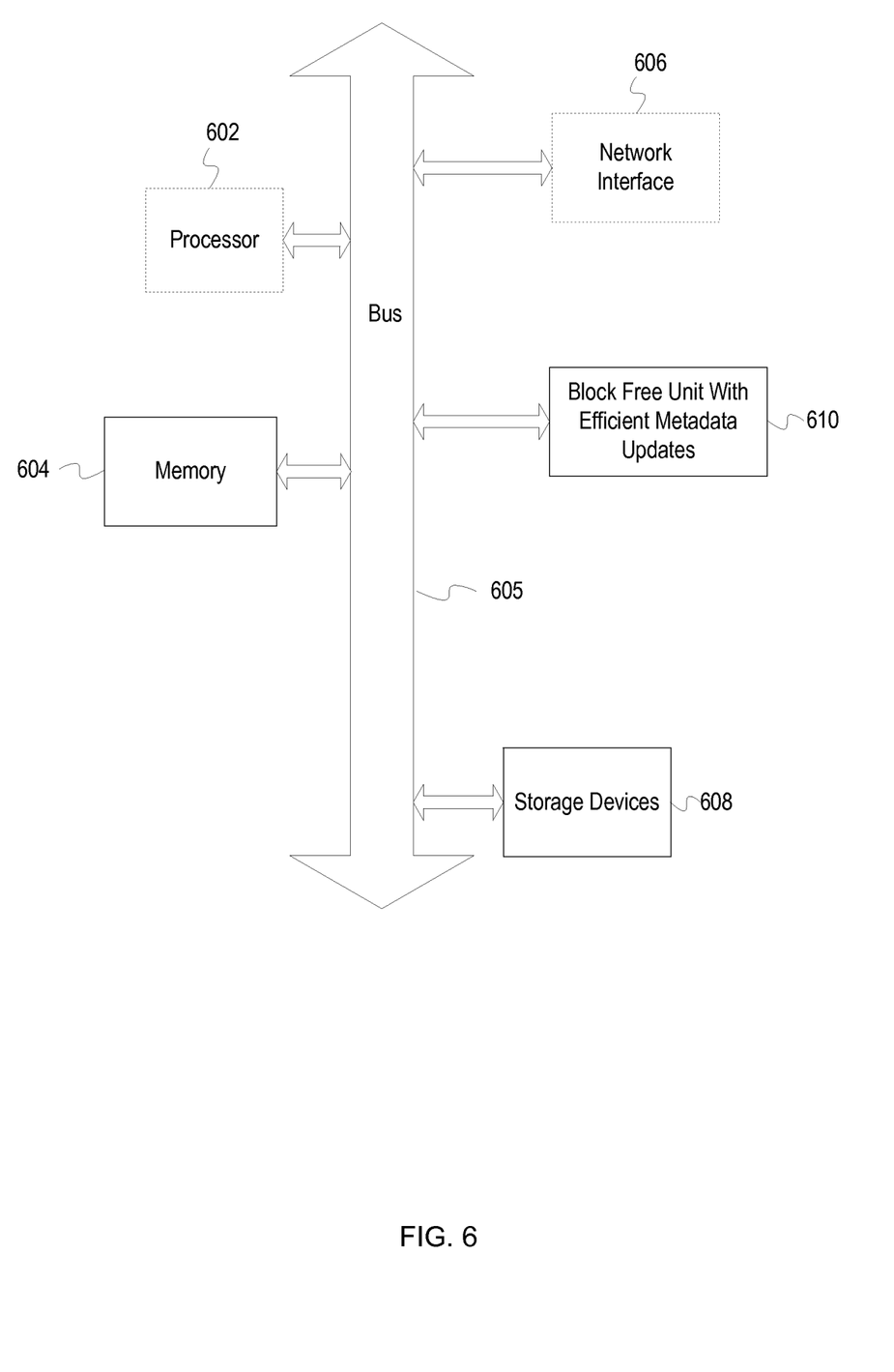
FIG. 6 depicts an example computer system for implementing the embodiments shown in FIGS. 1-5.

FIG. 6 depicts an example computer system with across-cluster redundancy management unit 610. The computer system includes a processor 602 (possibly including multiple processors, multiple cores, multiple nodes, and/or implementing multi-threading, etc.). The computer system includes memory 604 which may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes an interconnect 605 (e.g., PCI, ISA, PCI-Express, HyperTransport®, InfiniBand®, NuBus, etc.), a network interface 606 (e.g., an Ethernet interface, a Frame Relay interface, SONET interface, wireless interface, etc.), and a storage device(s) 608 (e.g., optical storage, magnetic storage, etc.). Redundancy management unit 610 embodies functionality to implement features described above with reference to FIGS. 1-5. Redundancy management unit 610 may perform operations that facilitate managing the takeover/giveback phases of an HA pair so that when configured in a clustered environment a node that performs takeover can efficiently recognize its HA takeover partner. Redundancy management unit 610 may perform operations that facilitate operations performed by member nodes of HA pairs configured in a cross-cluster configuration following replacement of a storage controller in one of the HA pairs. Any one of these functionalities may be partially (or entirely) implemented in hardware and/or on processor 602. For example, the functionality may be implemented with an application specific integrated circuit, in logic implemented in processor 602, in a co-processor on a peripheral device or card, etc. Further, realizations may include fewer or additional components not illustrated in FIG. 6 (e.g., additional network interfaces, peripheral devices, etc.).

As will be appreciated by one skilled in the art, aspects of the disclosed subject matter may be embodied as a system, method or computer program product. Accordingly, embodiments of the disclosed subject matter may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the disclosed subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the embodiments are described with reference to various implementations and exploitations, it will be understood that these embodiments are illustrative and that the scope of the disclosed subject matter is not limited to them. In general, techniques for non-disruptively replacing a storage controller as described herein may be implemented with facilities consistent with any hardware system or hardware systems. Many variations, modifications, additions, and improvements are possible.

What is claimed is:

1. A method for managing nodes within a storage cluster environment, comprising:
during a storage redundancy giveback from a first node to a second node where the storage redundancy giveback is performed in response to the second node becoming available, after a hardware modification to the second node, for initialization after the first node performed a storage redundancy takeover for the second node in response to the second node failing, initializing the second node following the storage redundancy takeover, wherein the initializing the second node comprises:
receiving from the second node a node identification indicator that includes an intra-cluster node connectivity identifier, and
determining whether the second node is an intra-cluster takeover partner for the first node based on the intra-cluster node connectivity identifier, and
in response to determining that the second node is the intra-cluster takeover partner for the first node, performing a giveback of storage resources from the first node to the second node.

2. The method of claim 1, wherein the determining whether the second node is an intra-cluster takeover partner comprises comparing the intra-cluster node connectivity identifier received from the second node with intra-cluster connectivity information of the first node.

3. The method of claim 1, further comprising receiving, during a giveback wait phase of the storage redundancy giveback, a node advertisement message sent by the second node, the node advertisement message comprising the node identification indicator.

4. The method of claim 1, wherein the first node and the second node are coupled to storage devices via one or more switches, and wherein the intra-cluster node connectivity identifier comprises an identifier of a switch of the one or more switches.

5. The method of claim 1, wherein the initializing the second node further comprises booting the second node, and wherein the receiving occurs during a giveback phase of the booting.

6. The method of claim 1, wherein the first node and the second node are configured as a first high-availability (HA) storage controller pair in a first storage cluster, and wherein the storage cluster environment further includes a third node and a fourth node configured as a second HA storage controller pair in a second storage cluster, the method further comprising:
in response to performing the giveback of storage resources from the first node to the second node:
reading a copy of cross-cluster configuration information stored locally by the second node,
determining that a storage controller device identifier specified by the copy of the cross-cluster configuration information is different than an identifier associated with a storage controller device within the second node, and
in response to determining that the storage controller device identifier specified by the copy of the cross-cluster configuration information is different than the identifier associated with the storage controller device within the second node, sending a storage controller replacement message to the first node, the third node, and the fourth node to indicate a storage controller device replacement was performed for the second node, wherein the first node, the second node, the third node, and the fourth node belong to a cross-cluster storage redundancy configuration that is configured based on the cross-cluster configuration information.

7. The method of claim 6, further comprising:
determining that the first node, the fourth node, and the third node have modified locally stored copies of the cross-cluster configuration information based on the storage controller replacement message; and
in response to determining that the first node, the fourth node, and the third node have modified locally stored copies of the cross-cluster configuration information, modifying the copy of the cross-cluster configuration information locally stored by the second node.

8. The method of claim 6, wherein the storage controller replacement message specifies a controller device identifier associated with a node configuration identifier, the method further comprising:
replacing controller device identifiers within copies of the cross-cluster configuration information locally stored by the first node, the third node, and the fourth node.

9. A non-transitory machine readable medium having stored thereon instructions for performing a method comprising program code which when executed by at least one machine, causes a machine to:
during a storage redundancy giveback from a first node to a second node where the storage redundancy giveback is performed in response to the second node becoming available, after a hardware modification to the second node, for initialization after the first node performed a storage redundancy takeover for the second node in response to the second node failing, initialize the second node following the storage redundancy takeover, wherein the program code to initialize the second node includes program code to:
receive from the second node a node identification indicator that includes an intra-cluster node connectivity identifier, and determine whether the second node is an intra-cluster takeover partner for the first node based on the intra-cluster node connectivity identifier, and in response to determining that the second node is the intra-cluster takeover partner for the first node, perform a giveback of storage resources from the first node to the second node.

10. The non-transitory machine readable medium of claim 9, wherein the hardware modification corresponds to a storage controller replacement for the second node.

11. The non-transitory machine readable medium of claim 9, wherein the program code to initialize the second node comprises program code for booting the second node, and wherein the receiving occurs during a giveback phase of the booting.

12. The non-transitory machine readable medium of claim 9, wherein the first node and the second node are configured as a first high-availability (HA) storage controller pair in a first storage cluster, and wherein a storage cluster environment includes a third node and a fourth node configured as a second HA storage controller pair in a second storage cluster, the program code further comprising program code to:

in response to performing the giveback of storage resources from the first node to the second node:
read a copy of cross-cluster configuration information stored locally by the second node,
determine that a storage controller device identifier specified by the copy of cross-cluster configuration information is different than an identifier associated with a storage controller device within the second node, and
in response to determining that the storage controller device identifier specified by the copy of the cross-cluster configuration information is different than the identifier associated with the storage controller device within the second node, send a storage controller replacement message to the first node, the third node, and the fourth node to indicate a storage controller device replacement was performed for the second node, wherein the first node, the second node, the third node, and the fourth node belong to a cross-cluster storage redundancy configuration that is configured based on the cross-cluster configuration information.

13. The non-transitory machine readable medium of claim 12, further comprising program code to:
determine that the first node, the fourth node, and the third node have modified locally stored copies of the cross-cluster configuration information based on the storage controller replacement message; and
in response to determining that the first node, the fourth node, and the third node have modified locally stored copies of the cross-cluster configuration information, modify the copy of the cross-cluster configuration information locally stored by the second node.

14. The non-transitory machine readable medium of claim 12, wherein the storage controller replacement message specifies a controller device identifier associated with a node configuration identifier, the program code further comprising program code to:
replace controller device identifiers within copies of the cross-cluster configuration information locally stored by the first node, the third node, and the fourth node.

15. A computing device comprising:
at least one processor; and
a memory coupled to the processor which is configured to be capable of executing program code stored in the memory to:
during a storage redundancy giveback from a first node to a second node where the storage redundancy giveback is performed in response to the second node becoming available, after a hardware modification to the second node, for initialization after the first node performed a storage redundancy takeover for the second node in response to the second node failing, initialize the second node by:
receiving from the second node a node identification indicator that includes an intra-cluster node connectivity identifier, and
determining whether the second node is an intra-cluster takeover partner for the first node based on the intra-cluster node connectivity identifier, and
in response to determining that the second node is the intra-cluster takeover partner for the first node, perform a giveback of storage resources from the first node to the second node.

16. The computing device of claim 15, wherein the hardware modification corresponds to a storage controller replacement for the second node.

17. The computing device of claim 15, wherein the program code to initialize the second node comprises program code executable by the processor to boot the second node, and wherein the receiving occurs during a giveback phase of the booting.

18. The computing device of claim 15, wherein the first node and the second node are configured as a first high-availability (HA) storage controller pair in a first storage cluster, and wherein a storage cluster environment includes a third node and a fourth node configured as a second HA storage controller pair in a second storage cluster, wherein the program code further comprises program code executable by the processor to:
in response to performing the giveback of storage resources from the first node to the second node:
read a copy of cross-cluster configuration information stored locally by the second node,
determine that a storage controller device identifier specified by the copy of cross-cluster configuration information is different than an identifier associated with a storage controller device within the second node, and
in response to determining that the storage controller device identifier specified by the copy of cross-cluster configuration information is different than the identifier associated with the storage controller device within the second node, send a storage controller replacement message to the first node, the third node, and the fourth node, wherein the first node, the second node, the third node, and the fourth node belong to a cross-cluster storage redundancy configuration that is configured based on the cross-cluster configuration information.

19. The computing device of claim 15, wherein a storage controller replacement message indicates that a storage controller of the second node was replaced to address a failure of the second node.

20. The computing device of claim 15, wherein a storage controller replacement message specifies a controller device identifier associated with a node configuration identifier, the program code further comprising program code to cause the processor to:

replace controller device identifiers within copies of cross-cluster configuration information locally stored by the first node, a third node, and a fourth node.

\* \* \* \* \*